United States Patent
Delaruelle

(12) 
(10) Patent No.: US 6,375,276 B1
(45) Date of Patent: Apr. 23, 2002

(54) RAILWAY BRAKE SYSTEM INCLUDING ENHANCED PNEUMATIC BRAKE SIGNAL DETECTION AND ASSOCIATED METHODS

(75) Inventor: Dale Delaruelle, Melbourne, FL (US)

(73) Assignee: GE-Harris Railway Electronics, LLC, Melbourne, FL (US)

(*) Notice: Subject to any disclaimer, the term of this patent is extended or adjusted under 35 U.S.C. 154(b) by 0 days.

(21) Appl. No.: 09/239,035

(22) Filed: Jan. 27, 1999

Related U.S. Application Data

(60) Provisional application No. 60/072,861, filed on Jan. 28, 1998.

(51) Int. Cl.[7] .............................................. B60T 13/00
(52) U.S. Cl. .......................................... 303/7; 303/128
(58) Field of Search .............................. 303/7, 128, 81, 303/28, 29, 30; 246/167 R, 182 R, 182 A, 182 B

(56) References Cited

U.S. PATENT DOCUMENTS

| | | | |
|---|---|---|---|
| 3,380,399 A | | 4/1968 | Southard et al. ............... 105/61 |
| 4,344,138 A | * | 8/1982 | Frasier ........................ 364/426 |
| 4,553,723 A | | 11/1985 | Nichols et al. .............. 246/167 |
| 4,582,280 A | | 4/1986 | Nichols et al. .......... 246/182 R |
| 5,511,749 A | * | 4/1996 | Horst et al. .............. 246/187 A |
| 5,538,331 A | * | 7/1996 | Kettle, Jr. ..................... 303/15 |
| 5,740,029 A | * | 4/1998 | Ferri et al. .................. 364/132 |

* cited by examiner

Primary Examiner—Paul N. Dickson
Assistant Examiner—Bradley King
(74) Attorney, Agent, or Firm—Carl A. Rowold; Armstrong Teasdale LLP

(57) ABSTRACT

A railway brake system for a train includes a brake pipe extending along the train, a lead unit controller generating a pneumatic control signal propagated along the brake pipe, and at least one remote unit controller. The remote unit controller preferably includes a brake pipe control valve, such as a relay valve, connected in fluid communication with the brake pipe for selectively charging and exhausting the brake pipe, an air flow rate sensor for sensing air flow into the brake pipe during charging, a brake pipe pressure sensor for sensing brake pipe pressure, and a processor for detecting the pneumatic control signal from the lead unit controller based upon both the air flow rate sensor and the brake pipe pressure sensor. Accordingly, the sensitivity of detection is increased despite delayed operation of the relay valve, and while avoiding false indications. Multiple detection sensitivities may be used. The detection may be used to cut-out the remote unit controller and idle down the locomotive, as when radio communications are lost. The detection may also be used for brake pipe continuity testing and/or to determine the relative position of the remote unit along the train.

25 Claims, 2 Drawing Sheets

RAILWAY BRAKE SYSTEM INCLUDING ENHANCED PNEUMATIC BRAKE SIGNAL DETECTION AND ASSOCIATED METHODS

RELATED APPLICATION

This application is based upon copending provisional application No. 60/072,861 filed Jan. 28, 1998, the entire disclosure of which is incorporated herein by reference.

FIELD OF THE INVENTION

The present invention is related to the field of braking systems, and, more particularly, to railway braking systems and related methods.

BACKGROUND OF THE INVENTION

Trains are widely used to transport people and freight. Freight trains in particular may be relatively long and include several groups of locomotives (consists). For example, a freight train may include 150 or more rail cars and extend over a mile or more. Coordination of control is required for operating the separated locomotives to ensure proper traction and braking, for example.

U.S. Pat. Nos. 4,582,280 and 4,553,723 to Nichols et al. are seminal patents directed to a radio communication based train control system. The radio communication system is for a lead unit and a plurality of remote units. The system includes a protocol for establishing a communication link between the lead unit and the one or more remote units. The protocol prevents any of the units in the system from processing messages or commands from other units in other train systems or processing messages or commands originating from units with the train system but which are addressed to other units. The control system provides for the coordinated control of the throttle and air braking functions in the train.

GE Harris Railway Electronics, L.L.C. offers a radio based control system under the designation LOCOTROL® which provides coordinated distributed power and air brake control of the remote locomotives from the lead locomotive as described in the above referenced patents. The system controls tractive effort and braking effort for up to four consists for all types of freight over all types of terrain. Each equipped unit can be operated as a head-end (lead unit), or a remote unit.

Distributed power and brake systems as described above which use radio communications for remote control and monitoring of unmanned locomotives also typically use the train brake pipe as a back-up communication link. This back-up link functions to idle the remote locomotives and cut-out control of the train brakes by the remote unit in the event of an interruption of the radio communications link. Without such a feature, a remote unit unable to receive radio communications could be operating adverse to the desired train operation. With the back-up link provided by the brake pipe, the train may continue to operate, such as to pass completely through a tunnel, for example.

Previous brake systems, such as the LOCOTROL® systems, have used pneumatic and electronic processing of the brake pipe charging flow rate at the remote unit to detect a brake application initiated by the driver at the lead unit. More particularly, the flow rate of air charging the brake pipe at the remote unit has been sensed by a differential pressure sensor associated with a restriction in a flow adaptor that is connected in fluid communication upstream of a relay valve. The relay valve selectively couples air from the main reservoir to charge the brake pipe at the remote unit. Alternately, the relay valve may also exhaust air from the brake pipe. The relay valve is controlled by a pressure in an equalizing reservoir which, in turn, is controlled under normal operations from electro-pneumatically operated valves controlled by the radio communication signals.

For example, if radio communications are lost and the lead unit causes an application of the brakes, a pressure reduction is propagated down the brake line. The flow sensor at the remote unit determines that the flow has increased indicative of brake application without receipt of the radio signal. This is used to cause the remote unit to cut-out its active braking control and idle the locomotive so that the remote unit becomes passive.

Unfortunately, the processing of the charging flow rate alone is become increasingly more difficult. This is so for two reasons. First, many railroads are operating remote locomotives from the end of the train. Accordingly, because of the increased effective length of the brake pipe through which the pneumatic signal must travel, flow sensing at the end of the train is more difficult than at a mid-train location, for example. Second, the characteristics of the typical relay valves used at remote units in some electronic brake systems differ from those used in the older style 26-L pneumatic systems. The 26-L relay valve typically begins to charge the brake pipe when the brake pipe is at a pressure less than 1 psi below the equalizing reservoir pressure. However, the relay valves used in electronic brake systems have been observed to delay charging the brake pipe until the pressure in the brake pipe is 2 psi or more below the equalizing reservoir pressure. This effect significantly desensitizes the air flow sensing approach as currently used, since the relay valve does not respond for the first 2 psi or more of pressure reduction in the brake pipe.

Another drawback with sensing only the flow rate is that some railroads may chose to operate a remote unit without the brake valve being operable. Accordingly, because the flow sensor is upstream of the relay valve, flow sensing alone cannot be used to detect the idle down command to the locomotive in the event of a loss of radio communications.

SUMMARY OF THE INVENTION

In view of the foregoing background, it is therefore an object of the present invention to provide a railway brake system which is more sensitive to the pneumatic control signal from a lead unit, but which also avoids false detections.

It is another object of the present invention to provide a railway brake system wherein a remote unit can receive an idle down signal from the brake pipe even when the flow sensing is not active.

These and other objects, features and advantages in accordance with the present invention are provided by a railway braking system comprising a brake pipe extending along the train, a lead unit controller generating a pneumatic control signal propagated along the brake pipe, and at least one remote unit controller. The remote unit controller preferably includes a brake pipe control valve, such as a relay valve, connected in fluid communication with the brake pipe for selectively charging and exhausting the brake pipe, and an air flow rate sensor for sensing air flow into the brake pipe during charging by the brake pipe control valve. More particularly, the remote unit controller also includes a brake pipe pressure sensor for sensing brake pipe pressure, and a processor for detecting the pneumatic control signal from the lead unit controller based upon both the air flow rate sensor and the brake pipe pressure sensor. Accordingly, the sensitivity of detection is increased despite delayed operation of a relay valve, for example, and while avoiding false indications.

The detection may be used to cut-out the remote unit controller and idle down the locomotive, as when radio communications are lost. The brake pressure sensing can also be used to receive a locomotive idle down command upon loss of radio communications and when the brake pipe control valve on the remote unit is not operating. The detection may also be used for brake pipe continuity testing and/or to determine the relative position of the remote unit relative to other remote units along the train.

The processor may comprise means for generating a sum of values representative of a change in air flow rate and a change in brake pipe pressure, and a comparator for comparing the sum of values to a threshold to detect the pneumatic control signal. In one embodiment, the air flow rate sensor comprises a restriction in fluid communication between the brake pipe and an air reservoir, and a differential pressure sensor associated with the restriction for sensing a differential pressure related to the air flow rate into the brake pipe. Accordingly, each value of the sum is based upon a change in differential pressure between a starting differential pressure and a respective sampled differential pressure, and a change in brake pipe pressure between a starting brake pipe pressure and a respective sampled brake pipe pressure multiplied by an effect multiplier. The effect multiplier takes into account the difference between the differential pressure sensing of the flow sensor, and the pressure sensing of the brake pipe pressure. The sum of values are preferably collected over a predetermined time.

According to another advantageous feature of the invention, the processor may have at least first and second sensitivities. For example, the first sensitivity may be lower for an initial brake application, and the second sensitivity may be greater for a supplemental brake application after the initial brake application. Accordingly, the dual sensitivities provide high accuracy of detection and while avoiding false detections. The two sensitivities may be obtained by using different times for collecting the flow and brake pressure data.

Of course, the brake control system preferably includes a radio communication system permitting remote control of the at least one remote unit controller by the lead unit controller by radio communication signals. Accordingly, the processor may further comprise cut-out means for cutting-out control of brake pipe pressure by the remote unit controller based upon a loss of radio communications and detecting the pneumatic control signal. The processor may also include locomotive idle down means for idling the locomotive, and based upon the pressure change alone as when the flow sensing is not active.

In accordance with another advantageous feature of the invention, the processor may further comprise continuity confirming means for confirming continuity of the brake pipe based upon a radio communication signal and detecting the pneumatic control signal, as when the train is first coupled together. In addition, the processor may include location determining means for determining a location of the at least one remote unit controller relative to other remote units based upon a radio communication signal and a time until detecting the pneumatic control signal.

A method aspect of the invention is for detecting receipt of a pneumatic control signal propagated along a brake pipe from a lead unit controller to at least one remote unit controller of a train brake system. The method preferably comprises the steps of using the remote unit controller for sensing air flow into the brake pipe during charging thereof, sensing brake pipe pressure, and detecting the pneumatic control signal from the lead unit controller based upon sensing of the air flow and brake pipe pressure.

DETAILED DESCRIPTION OF THE PREFERRED EMBODIMENTS

The present invention will now be described more fully hereinafter with reference to the accompanying drawings, in which preferred embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like numbers refer to like elements throughout.

Figure 1:
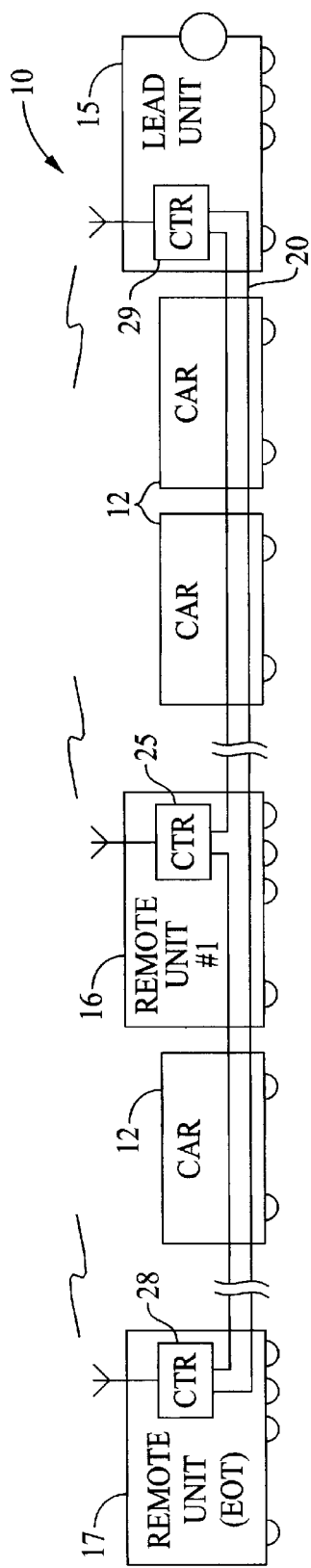
FIG. 1 is a schematic diagram of a train including the railway brake system in accordance with the present invention.
Figure 2:
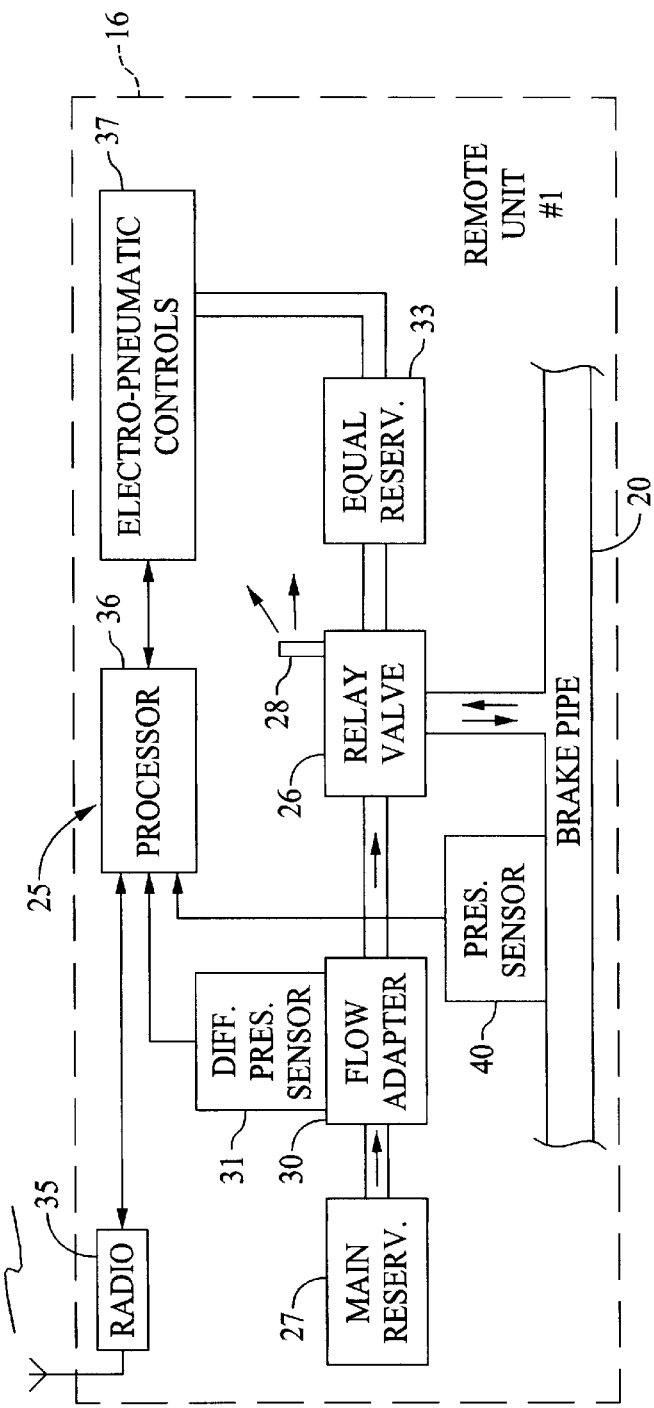
FIG. 2 is a simplified schematic diagram of a remote unit controller in accordance with the present invention.

Referring to FIGS. 1 and 2 the railway braking system 10 in accordance with the present invention is first described. The railway braking system 10 is illustratively implemented on a train including a plurality of railway cars 12, a lead unit 15, a mid-train first remote unit 16, and an end-of train remote unit 17. Those of skill in the art will appreciate that each remote unit may be a group of locomotives or a single locomotive. In addition, only a single remote unit or a plurality of remote units may be included for typical trains.

The brake system includes the schematically illustrated brake pipe 20 extending along the length of the train. The brake pipe 20 is conventionally used to supply brake reservoirs on the individual cars (not shown) as would be readily understood by those skilled in the art. The brake pipe 20 may also be used to cause application of the brakes of the railway cars 12, by one or a series of pressure reductions as would also be readily understood by those skilled in the art and as also explained in U.S. Pat. No. 4,553,723 the entire disclosure of which is incorporated herein by reference.

The lead unit 15 includes a lead unit controller 29 that may cause a pneumatic control signal to be propagated along the brake pipe to at least one of the remote unit controllers 25, 28, as will be described in greater detail below. The pneumatic brake pipe signal is typically a pressure reduction that causes the cars to apply their respective brakes. The remote unit controller 25, 28, in turn, may detect the pneumatic control signal in certain circumstances, such as a loss of radio communications, and thus cause certain other functions as will be described in greater detail below.

As understood with particular reference to FIG. 2, a remote unit, such as the first remote unit 16, may include a remote unit controller 25. For clarity of explanation, the remote unit controller 25 illustrates only the major air brake related portions, although the remote unit controller may also be used to control the locomotive throttle, for example, as will be readily appreciated by those skilled in the art. The remote unit controller 25 includes a relay valve 26 connected in fluid communication with the brake pipe 20 for selectively charging air into and exhausting air from the brake pipe. The relay valve 26 is connected to the main reservoir 27 of the locomotive to provide an air supply to charge the brake pipe 20. The relay valve 26 may also include a port 28 for exhausting air from the brake pipe 20 as when a brake application is initiated at the remote unit.

A flow adaptor 30 is connected in fluid communication between the relay valve 26 and the main reservoir 27. The flow adaptor 30 includes a restriction therein, not shown, to limit the amount of air that may be supplied to the brake pipe 20 so that the relay valve would not override an emergency brake application, for example, as will be appreciated by those skilled in the art. The flow adaptor 30 also illustratively has a differential pressure sensor 31 associated therewith which senses the differential pressure across the restriction. The differential pressure sensor 31 and restriction of the flow adaptor 30 provide a flow rate sensor for generating a flow rate signal related to the flow of air into the brake pipe 20. Dual differential pressure sensors may be used in other embodiments for redundancy. Other flow rate sensors are also contemplated by the present invention. For example, high and low side gage pressure sensors may be used with their respective outputs subtracted to determine the differential pressure.

The relay valve 26 is controlled by a pressure in the equalizing reservoir 33. The pressure in the equalizing reservoir 33 is typically set in the remote unit 16 by a radio signal received from the lead unit 15. More particularly, the remote unit controller 25 also includes a radio 35 for receiving radio signals from a similar radio in the lead unit 15. The illustrated processor 36 processes the received radio signals and controls the pressure in the equalizing reservoir 33 using the electro-pneumatic controls 37. The operation of the radio 35, processor 36, electro-pneumatic controls 37, and equalizing reservoir 33 will be readily appreciated by those skilled in the art without further discussion.

In other embodiments of the invention, the relay valve 26 may be replaced, for example, by a valve which is directly controlled by electrical signals without the use of the pilot pressure controlled using the illustrated equalizing reservoir 33. Accordingly, the term "brake pipe control valve" is used herein to cover both the relay valve and other such equivalent valve structures which at least selectively charge the brake pipe 20.

A key aspect of the present invention is the use of the brake pipe pressure sensor 40 in conjunction with the flow rate sensing, provided by the differential pressure sensor 31, to increase the accuracy of detection of a pneumatic control signal sent along the brake pipe 20 from the lead unit controller 29. More particularly, the processor 36 detects the pneumatic control signal from the lead unit controller 29 based upon both the differential pressure sensor 31 and the brake pipe pressure sensor 40. Accordingly, the sensitivity of detection is increased despite delayed operation of the relay valve 26, and while avoiding false indications. Some modern electronic brake control systems may include relay valves that are especially susceptible to having delayed operation. Accordingly, the invention overcomes this potential drawback of electronic brake control systems.

The detection of the pneumatic signal from the lead unit controller 29 may be used for a number of purposes. For example, the detection can be used to cut-out the remote unit controller 25 from charging or exhausting the brake pipe, and idle down the locomotive, as when radio communications are lost. The brake pressure sensing can also be used to receive a locomotive idle down command upon loss of radio communications and when the relay valve on the remote unit is not operating, that is, when the flow rate signal is inactive. The detection may also be used for brake pipe continuity testing and/or to determine the relative position of the remote unit relative to other remote units along the train.

The processor 36 may comprise means for generating a sum of values representative of a change in air flow rate and a change in brake pipe pressure, and a comparator for comparing the sum of values to a threshold to detect the pneumatic control signal. The means for generating the sum and the comparator may be provided by a microprocessor operating under stored program control to perform an algorithm as described in greater detail below, for example. Those of skill in the art will appreciate that conventional logic circuits may also be readily configured to perform the arithmetic and comparison functions.

In the illustrated embodiment, the air flow rate sensor comprises a restriction in the flow adaptor in fluid communication between the brake pipe 20 and the main air reservoir 27, and a differential pressure sensor 31 associated with the restriction for sensing a differential pressure related to the air flow rate into the brake pipe. Each value of the sum is based upon a change in differential pressure between a starting differential pressure and a respective sampled differential pressure, and a change in brake pipe pressure between a starting brake pipe pressure and a respective sampled brake pipe pressure multiplied by an effect multiplier. The effect multiplier takes into account the difference between the differential pressure sensing of the flow sensor, and the pressure sensing of the brake pipe pressure. The sum of values are preferably collected over a predetermined time.

The flow analysis algorithm used in prior art LOCOTROL® systems may be considered a "floating integration" as described in U.S. Pat. No. 4,553,723. This method is based on periodic (0.5 second) sampling of only the charging flow rate in accordance with the following algorithm:

$$\text{Flow value} = \text{SUM}[(\Delta P_1 - \Delta P_0), (\Delta P_2 - \Delta P_0), \ldots (\Delta P_{60} - \Delta P_0)],$$

and wherein:

$\Delta P_0$: Reference (oldest) differential pressure (flow) value. Optionally this may be an average of several old samples prior to $\Delta P_1$;

$\Delta P_1$: Oldest differential pressure (flow) value in the integration or summation period; and $\Delta P_{60}$: Newest differential pressure (flow) value in the 30 second integration period.

The calculated flow value for a 30 second period is compared to a limit or threshold, such as 8 psi*sec., to determine whether the pneumatic brake pipe signal has been detected. Of course, the sensing of only the flow rate leads to the disadvantages as set forth in the background of the invention. These disadvantages and shortcomings are particularly evident for longer trains.

In accordance with the present invention, the effect of the remote unit brake pipe pressure reduction, which the relay valve permits due to its delay, is added to the increase in the charging flow rate at each of the periodic samples. In other words, the processor 36 implements an algorithm as follows:

$$\text{Flow value} = \text{SUM}[(\Delta P_1 - \Delta P_0) - M^*(BP_1 - BP_0), (\Delta P_2 - \Delta P_0) - M^*(BP_2 - BP_0), \ldots (\Delta P_{60} - \Delta P_0) - M^*(BP_{60} - BP_0)],$$

and wherein:

$\Delta P_0$: Reference (oldest) differential pressure (flow) value. Optionally this may be an average of several old samples prior to $\Delta P_1$;

$BP_0$: Reference (oldest) brake pipe pressure value. Optionally this may be an average of several old samples prior to $BP_1$;

$\Delta P_1$: Oldest differential pressure (flow) value in the integration period;

$BP_1$: Oldest brake pipe pressure value in the integration period;

$\Delta P_{60}$: Newest differential pressure (flow) value in the 30 second integration period;

$BP_{60}$: Newest brake pipe pressure value in the 30 second integration period; and M: Pressure effect multiplier, and an initial value may be 0.4, for example.

For example, the calculated flow value for a 30 second period may be compared to a threshold or limit, such as 8, to determine whether the pneumatic brake pipe signal has been detected. Considered in other terms, the invention has the advantage of combining the effects of the brake pipe charging flow increase with the brake pressure reduction on each sample of the integration.

One method aspect of the invention is for detecting receipt of a pneumatic control signal propagated along a brake pipe 20 from a lead unit controller 29 to at least one remote unit controller 25 of a train brake system 10. The method preferably comprises the steps of sensing air flow into the brake pipe 20 during charging thereof, sensing brake pipe pressure, and detecting the pneumatic control signal from the lead unit controller based upon sensing of the air flow and brake pipe pressure. These steps are performed using the remote unit controller 25 as described above.

According to another advantageous feature of the invention, the processor 36 may be operable at first and second sensitivities. For example, the first sensitivity may be lower for an initial brake application, and the second sensitivity may be greater for a supplemental brake application after the initial brake application. The two sensitivities provide high accuracy of detection and while avoiding false detections. The two sensitivities may be obtained by using different times for collecting the flow and brake pressure data. For example, the lower sensitivity may take samples each half second for about 9 seconds, the higher sensitivity may take similar samples for about 30 seconds. Other sampling rates and times are also possible. In some embodiments, a common comparison threshold may be used for both sensitivities, although the comparison threshold may be different in other embodiments as will be readily understood by those skilled in the art.

Figure 3:
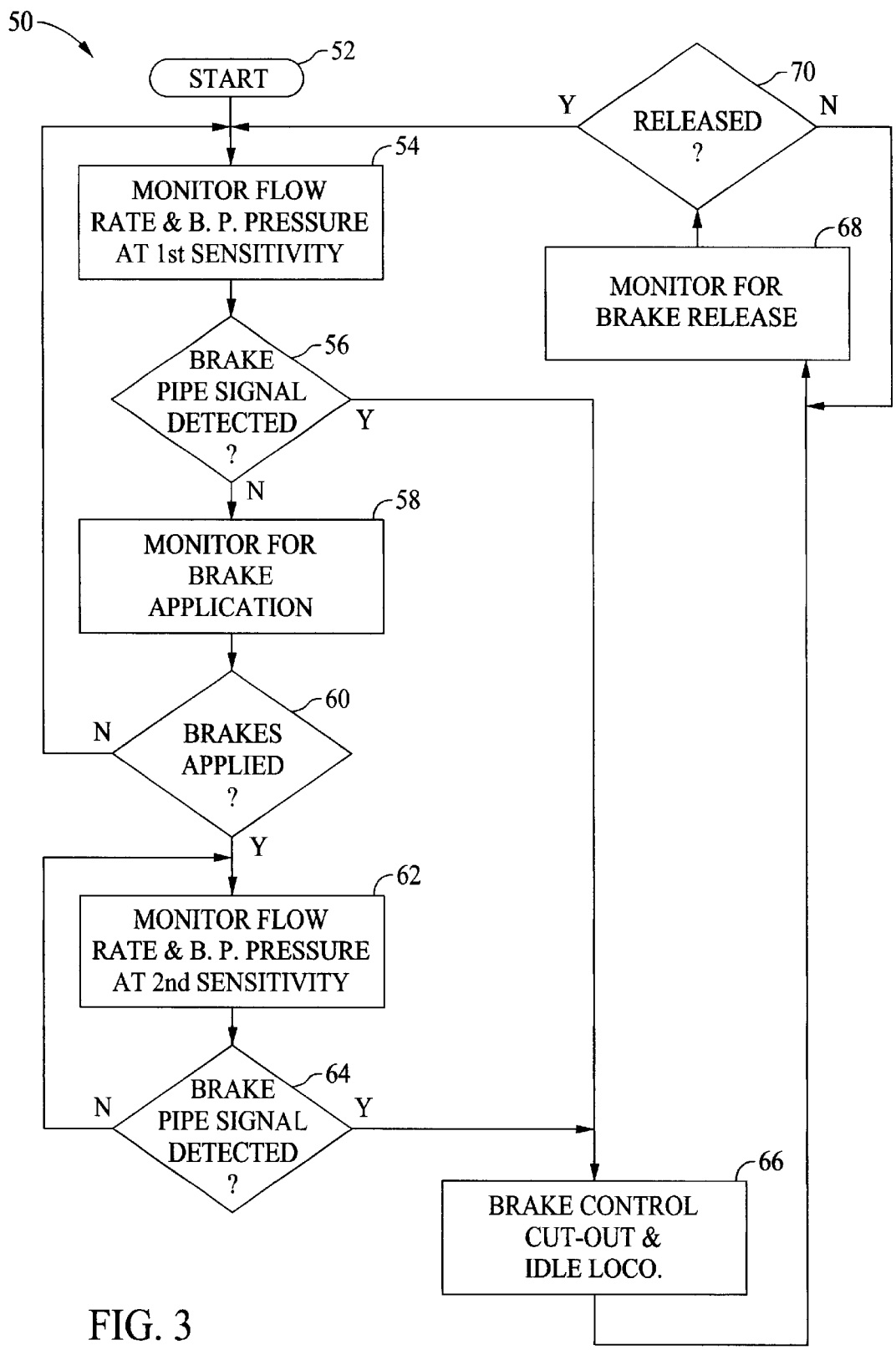
FIG. 3 is a flow chart illustrating a method using two detection sensitivities in accordance with an embodiment of the invention.

Referring now additionally to the simplified program flow chart 50 of FIG. 3, the dual sensitivity feature of the invention is further described. From the start (Block 52), the remote unit controller 25 monitors the flow rate and brake pipe pressure at a first relatively low sensitivity at Block 54. Of course, the brake system has already had a full brake release prior to the start.

At Block 56 it is determined whether the pneumatic brake pipe signal has been received at the remote unit controller 25 as described extensively above. If the signal has been detected, then the system will illustratively cause a cut-out of the brake control at the remote unit 16, and idle down the locomotive at Block 66.

If, however, the signal is not detected, the system is monitored to determine if a first brake application has been commanded and achieved via the normal radio communication scheme (Block 58) as explained above. If the brakes have been applied, that is, there has been a commanded and executed reduction of the brake pipe pressure as determined at Block 60, then at Block 62 the flow rate and brake pipe pressure are monitored at a second higher sensitivity. This higher sensitivity ensures that a pneumatic brake pipe signal will be reliably detected at the remote unit controller 25. At the same time, the lower initial sensitivity reduces the likelihood of false detections.

At Block 64, it is determined whether the pneumatic brake pipe signal is detected, and, if so, the brake control is cut-out and the locomotive is idled at Block 66. If the pneumatic brake pipe signal is not detected at Block 64, the system continues to monitor the brake pipe pressure and flow rate at the second higher sensitivity at Block 62 as would be readily appreciated by those skilled in the art.

After the brake control has been cut-out and the locomotive idled at Block 66, the system will monitor for a brake release signal at Block 68. If the brakes are released as determined at Block 70, then the system returns to Block 54 where monitoring is conducted according to the first sensitivity.

Considering now other features of the invention, the brake control system 10 preferably includes a radio communication system permitting remote control of the remote unit controllers 25, 28 by the lead unit controller 29 by radio communication signals. Accordingly, the processor 36 may further comprise cut-out means for cutting-out control of brake pipe pressure by the remote unit controller based upon a loss of radio communications and detecting the pneumatic control signal. The cut-out means may also idle down the locomotive based solely on the change in brake pipe pressure, and may do so even if the relay valve and flow sensing are inactive. Accordingly, a railroad may operate a remote locomotive without using the active braking functions, while retaining the capability to idle down the locomotive in the event of a loss of radio communications.

In accordance with another advantageous feature of the invention, the processor 36 may further comprise continuity confirming means for confirming continuity of the brake pipe based upon a radio communication signal and detecting the pneumatic control signal, as when the cars and locomotives of the train are first coupled together. In addition, the processor 36 may include location determining means for determining a location of the at least one remote unit relative to other remote units of the train based upon a radio communication signal and a time until detecting the pneumatic control signal. Each of these recited means may be readily provided by a microprocessor operating under stored program control or discrete circuits as will be readily appreciated by those skilled in the art.

Many modifications and other embodiments of the invention will come to the mind of one skilled in the art having the benefit of the teachings presented in the foregoing descriptions and the associated drawings. Therefore, it is to be understood that the invention is not to be limited to the specific embodiments disclosed, and that modifications and embodiments are intended to be included within the scope of the appended claims.

That which is claimed is:

1. A railway brake system for a train comprising a lead unit, at least one remote unit and a plurality of railroad cars, the railway brake system comprising:

a brake pipe extending along the train;

a lead unit controller generating a pneumatic control signal propagated along said brake pipe;

at least one remote unit controller comprising a brake pipe control valve connected in fluid communication with said brake pipe for selectively charging and exhausting said brake pipe, an air flow rate sensor for sensing air flow into said brake pipe during charging by said brake pipe control valve, a brake pipe pressure sensor for sensing brake pipe pressure, and a processor for detecting the pneumatic control signal from said lead unit controller based upon both said air flow rate sensor and said brake pipe pressure sensor;

wherein said processor has at least first and second sensitivities;

wherein said air flow rate sensor comprises a restriction in fluid communication between said brake pipe and an air reservoir, and a differential pressure sensor associated with said restriction for sensing a differential pressure related to the air flow rate into said brake pipe; and wherein said processor comprises:

means for generating a sum of the values over a first time with each value based upon a change in differential pressure between a starting differential pressure and a respective sampled differential pressure, and a change in brake pipe pressure between a starting brake pipe pressure and a respective sampled brake pipe pressure multiplied by an effect multiplier; and means for generating a sum of the values over a second time longer than the first time with each value based upon a change in differential pressure between a starting differential pressure and a respective sampled differential pressure, and a change in brake pipe pressure between a starting brake pipe pressure and a respective sampled brake pipe pressure multiplied by the effect multiplier.

2. A railway brake system according to claim 1 wherein said brake pipe control valve has a delay in charging said brake pipe.

3. A railway brake system according to claim 1 wherein the first sensitivity is lower for an initial brake application, and the second sensitivity is greater for a supplemental brake application after the initial brake application.

4. A railway brake system according to claim 1 wherein said means for generating a sum of the values over a first time and said means for generating a sum of the values over a second time each compare respective sums of values to a common threshold.

5. A railway brake system according to claim 1 further comprising a radio communication system permitting remote control of the at least one remote unit controller by the lead unit controller by radio communication signals.

6. A railway brake system according to claim 5 wherein said processor further comprises cut-out means for cutting-out control of brake pipe pressure by the at least one remote unit controller based upon a loss of radio communications and detecting the pneumatic control signal.

7. A railway brake system according to claim 5 wherein said processor further comprises locomotive idle down means for idling a remote locomotive based upon a loss of radio communications and detecting the pneumatic control signal.

8. A railway brake system according to claim 7 wherein said locomotive idle down means is operable even with the flow sensor being inactive.

9. A railway brake system according to claim 5 wherein said processor further comprises continuity confirming means for confirming continuity of said brake pipe based upon a radio communication signal and detecting the pneumatic control signal.

10. A railway brake system according to claim 5 wherein said processor further comprises location determining means for determining a location of the at least one remote unit controller relative to at least one other remote unit controller based upon a radio communication signal and a time until detecting the pneumatic control signal.

11. A railway brake system for a train comprising a lead unit, at least one remote unit and a plurality of railroad cars, the railway brake system comprising:

a brake pipe extending along the train;

a lead unit controller generating a pneumatic control signal propagated along said brake pipe; and at least one remote unit controller comprising a brake pipe control valve connected in fluid communication with said brake pipe for selectively charging and exhausting said brake pipe, an air flow rate sensor for sensing air flow into said brake pipe during charging by said brake pipe control valve, a brake pipe pressure sensor for sensing brake pipe pressure, and a processor for detecting the pneumatic control signal from said lead unit controller based upon both said air flow rate sensor and said brake pipe pressure sensor, said processor having a first lower sensitivity for an initial brake application and a second higher sensitivity for a supplemental brake application after the initial brake application.

12. A railway brake system according to claim 11 wherein said brake pipe control valve has a delay in charging said brake pipe.

13. A railway brake system according to claim 11 wherein said air flow rate sensor comprises a restriction in fluid communication between said brake pipe and an air reservoir, and a differential pressure sensor associated with said restriction for sensing a differential pressure related to the air flow rate into said brake pipe; and wherein said processor comprises:

means for generating a sum of the values over a first time with each value based upon a change in differential pressure between a starting differential pressure and a respective sampled differential pressure, and a change in brake pipe pressure between a starting brake pipe pressure and a respective sampled brake pipe pressure multiplied by an effect multiplier; and means for generating a sum of the values over a second time longer time than the first time with each value based upon a change in differential pressure between a starting differential pressure and a respective sampled differential pressure, and a change in brake pipe pressure between a starting brake pipe pressure and a respective sampled brake pipe pressure multiplied by the effect multiplier.

14. A railway brake system according to claim 13 wherein said means for generating a sum of the values over a first time and said means for generating a sum of the values over a second time each compare respective sums of values to a common threshold.

15. A railway brake system according to claim 11 further comprising a radio communication system permitting remote control of the at least one remote unit controller by the lead unit controller by radio communication signals.

16. A railway brake system according to claim 15 wherein said processor further comprises cut-out means for cutting-out control of brake pipe pressure by the at least one remote unit controller based upon a loss of radio communications and detecting the pneumatic control signal.

17. A method for detecting receipt of a pneumatic control signal propagated along a brake pipe from a lead unit controller to at least on remote unit controller of a train brake system, the method comprising the steps of:

sensing air flow into the brake pipe during charging thereof using the remote unit controller;

sensing brake pipe pressure using the remote unit controller;

detecting the pneumatic control signal from the lead unit controller based upon sensing of the air flow and brake pipe pressure using the remote unit controller;

wherein the step of detecting comprises detecting using at least first and second sensitivities; and wherein the first sensitivity is lower for an initial brake application, and the second sensitivity is greater for a supplemental brake application after the initial brake application.

18. A method according to claim 17 further comprising the steps of:

remotely controlling the at least one remote unit controller using the lead unit controller over a radio communication system; and cutting-out control of brake pipe pressure by the at least one remote unit controller based upon a loss of radio communication and detecting the pneumatic control signal.

19. A method according to claim 17 further comprising the steps of:

remotely controlling the at least one remote unit controller using the lead unit controller over a radio communication system; and confirming continuity of the brake pipe based upon a radio communication signal and detecting the pneumatic control signal.

20. A method according to claim 17 further comprising the steps of:

remotely controlling the at least one remote unit controller using the lead unit controller over a radio communication system; and determining a location of the at least one remote unit controller relative to at least one other remote unit controller based upon a radio communication.

21. A method according to claim 17 wherein a brake pipe control valve is connected in fluid communication between the brake pipe and an air reservoir, and wherein the brake pipe control valve has a delay in charging the brake pipe.

22. A method according to claim 17 wherein the step of detecting comprises:

generating a sum of values representing of a change in air flow rate and a change in brake pipe pressure; and comparing the sum of values to a threshold to detect the pneumatic control signal.

23. A method according to claim 22 wherein the step of sensing air flow comprises sensing differential pressure across a restriction in fluid communication between the brake pipe and an air reservoir.

24. A method according to claim 23 wherein each value is generated based upon a change in differential pressure between a starting differential pressure and a respective sampled differential pressure, and a change in brake pipe pressure between a starting brake pipe pressure and a respective sampled brake pipe pressure multiplied by an effect multiplier.

25. A method according to claim 22 wherein the sum of values are collected over a predetermined time.

* * * * *